United States Patent [19]

Rhine

[11] 4,234,134
[45] Nov. 18, 1980

[54] PAPER TENSIONING DEVICE

[75] Inventor: Samuel Rhine, Beaumont, Tex.

[73] Assignee: Helena Laboratories Corporation, Beaumont, Tex.

[21] Appl. No.: 10,654

[22] Filed: Feb. 9, 1979

[51] Int. Cl.$^3$ .......................................... B65H 19/00
[52] U.S. Cl. ............................................... 242/55.2
[58] Field of Search ................ 242/55.2, 55.53, 75.4, 242/67.3 R, 67.4, 67.2, 67.1 R, 68, 68.4, 68.5

[56] References Cited

U.S. PATENT DOCUMENTS

| | | | |
|---|---|---|---|
| 445,265 | 1/1891 | Ray | 242/68.4 |
| 525,916 | 9/1894 | Merriman | 242/75.4 |
| 613,178 | 10/1898 | Unz | 242/68.4 |
| 1,431,834 | 10/1922 | Mohr | 242/67.3 R |
| 1,557,700 | 10/1925 | Jaderlund | 242/55.2 |
| 1,858,371 | 5/1932 | Lutz | 242/55.2 |
| 1,955,489 | 4/1934 | Duncan et al. | 242/68.4 |
| 2,571,321 | 10/1951 | Wettley | 242/55.2 |
| 2,889,122 | 6/1959 | McConnell | 242/55.2 |
| 2,916,226 | 12/1959 | McGraw, Jr. | 242/68.5 |
| 3,170,652 | 2/1965 | Kennedy | 242/55.53 X |
| 3,439,881 | 4/1969 | Ulmschneider | 242/68.5 |
| 3,480,222 | 11/1969 | Goodman et al. | 242/55.3 |
| 3,496,909 | 2/1970 | Bennett, Jr. | 242/75.4 |

*Primary Examiner*—Leonard D. Christian
*Attorney, Agent, or Firm*—Cullen, Sloman, Cantor, Grauer, Scott & Rutherford

[57] ABSTRACT

An improved paper tensioning device, for use with a chart recorder or densitometer of the type where the paper is tightly wound around a hollow core, which paper tensioning device prevents the chart paper from unwinding too fast. The paper tensioning device comprises a rod and plug combination with the plug secured to one end of the hollow core and with the rod being inserted through the hollow core, from the other end thereof, to mate with the plug. Axial pressure on the rod is maintained to cause a constant drag on the hollow core and on the chart paper. The plug and hollow core may be an integrally formed unit onto which the paper is wound. Optionally, the rod and plug may be a one piece unit or the rod, plug and core may be a one piece unit.

12 Claims, 11 Drawing Figures

PAPER TENSIONING DEVICE

BACKGROUND OF THE INVENTION

This invention relates generally to chart paper recording systems where data is recorded on moving chart paper as the paper is unwound from a rotatable supply roll and, more particularly, to an improved apparatus for preventing the paper from unwinding too fast. Chart recorders are, of course, well-known, and one common use of a chart recorder is in connection with densitometers of the type disclosed in U.S. Pat. No. 4,005,434, assigned to the Assignee of the present invention.

Densitometers are well-known devices which scan a sample and print a visible output signal on moving chart paper. The chart paper is initially tightly wound on a hollow core and is withdrawn from the core by a paper feed mechanism, which causes the paper and core to rotate.

One of the major problems associated with the feeding of paper is the need to unwind or withdraw the paper at a constant speed, and to stop the unwinding virtually instantaneously when the paper feed mechanism is stopped. In essence, the problem has two aspects. The first aspect is that the paper feed mechanism must provide sufficient force to overcome the inertia of a stationary paper supply roll to initiate rotation of the roll of paper. The second aspect of the problem is that the paper supply roll cannot rotate freely, i.e., drag must be provided to overcome the inertia of the rotating roll, so that when the paper feed mechanism stops, the rotation of the paper roll stops. If the paper roll rotates freely, or unwinds too fast, or does not stop when the paper feed mechanism stops, the paper can bunch up between the paper supply and the printing device. If the paper roll does not unwind fast enough, the paper feed mechanism can rip or tear the paper. The solution to these problems has been to maintain a constant external tension or drag on the paper supply to resist the force from the paper feed mechanism which tends to unwind the paper, and to thus stop the free rotation of the paper roll.

According to the prior art, an external spring loaded member was maintained in contact with the surface of the roll or supply of paper to create the drag on the paper. However, as the supply of paper was gradually used by unwinding the paper from the supply roll, the diameter of the remaining paper supply gradually decreased. Since the force from a spring is proportional to the working length of the spring, as the roll diameter decreased the working length of spring also decreased thus reducing the force or drag on the paper. Thus the prior art spring mechanism was unsatisfactory.

To overcome the problem of non-constant drag on the paper, the prior art provided a more complex tensioning device which consisted of a spring-loaded bar pressed against the roll of paper which bar has imparted to it an increasing amount of force as the chart paper roll diameter decreases to compensate for the decrease in the force from the spring, thus resulting in a net force on the paper which was substantially constant. The use of a complicated cam system was required in order to impart the increasing force on the tensioning device. This mechanism is inaccurate in that it created an uneven net pressure on the chart paper which was dependent upon the shape of the cam.

Thus the prior art, by attempting to modify spring-type tensioning devices by elaborate cam mechanisms, merely compounded the problem.

The tensioning device of the present invention overcomes the prior art difficulties of improper and imprecise tensioning of a cam and bar combination by totally eliminating all the external parts which provided the anti-rotational drag on the paper and by providing an entirely different approach to the problem of maintaining a constant drag on the chart paper. Specifically, the present invention maintains a constant drag on the roll of paper and does not require a direct external force on the surface of the paper.

SUMMARY OF THE INVENTION

The present invention provides for tensioning chart paper which paper is frictionally wound around a hollow central core by applying axial pressure to the core. The axial pressure is converted to a constant anti-rotational force on the core and hence a constant drag on the paper. The invention includes a plug, rigidly secured to one end of the core, and a rod or spindle which extends through the core to mate with the plug. Means are provided to exert axial pressure on the rod to cause a constant drag on the paper.

The present invention provides an inexpensive and dependable way to provide a constant tension on the roll of chart paper which may be taken into account in calculating the force needed by a motor to withdraw the chart paper in a smooth, continuous manner. The plug and rod provide a constant drag on the chart paper without the complexities of a cam and tension bar.

Another advantage of the present invention is that if the plug has been secured to the proper end of the paper roll when the paper is initially wound on the core, the user of the paper cannot insert a new roll of paper in the densitometer with the chart paper reversed.

BRIEF DESCRIPTION OF THE DRAWINGS

The foregoing objects of the present invention, together with other features and advantages which may be attained by its use, will become more apparent upon reading the following detailed description of the invention taken in conjunction with the drawings.

In the drawings, wherein like reference numerals identify corresponding parts.

DETAILED DESCRIPTION

The tensioning means of the present invention is provided to maintain a constant drag on paper 12 which paper is initially wound on a hollow tubular core 14. The paper 12, which is tightly frictionally wound around the core 14 is referred to as the roll of paper or paper supply roll. In a densitometer or similar device or instrument, means not shown are provided for withdrawing the paper from the roll.

Figure 1:
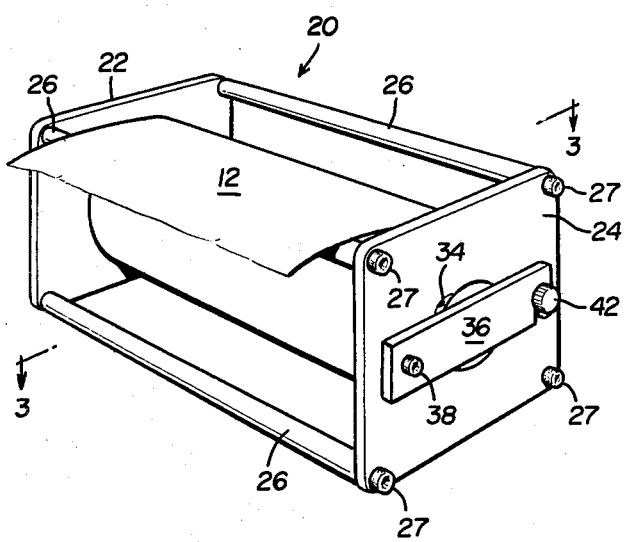
FIG. 1 is a perspective illustration of the paper tensioning device of the present invention including a first type of axial pressure means in an engaged position.

According to the principles of the present invention, means are provided to support the roll of paper and to exert an axial pressure on the core 14 to thereby place a constant drag on the paper 12 as the paper is unwound from the core. With reference to FIG. 1, support means for the roll of paper includes a support frame 20 having opposed end plates 22 and 24. The two end plates or walls are maintained in a fixed, spaced apart relationship by four elongated rods 26, with one rod at each corner of each end plate. Each end of each rod is threaded and the threaded rod ends extend through suitable apertures in the end plates and a nut 27 is provided to secure each end plate to the rod. The threaded portion of each end of each rod is of a slightly smaller diameter than the rod body itself so that at the junction of the rod body and the threaded portion thereof there is provided a shoulder on which the end plate will abut thus maintaining the end plates in the desired spaced apart relationship.

Since it is necessary for the roll of paper to rotate within the frame means 20 so that the paper may be withdrawn from the roll, suitable means are provided to permit rotation of the roll of paper. The end plate 22 includes a generally centered socket 28 and the end plate 24 has a generally centered aperture 30 therethrough. The aperture 30 has a circular portion which is chamfered or countersunk, as at 32, to provide a journaled bearing. The aperture 30 further includes, at one portion thereof, an additional circular opening or extension 34. The center of the circular opening 30 is offset from the center of the circular opening 34 so that the combined opening is elliptical.

According to the principles of the present invention, the support frame means 20 includes means to exert an axial pressure on the paper core. Specifically, means are provided to secure the roll of paper in place and exert the axial pressure thereon and this includes a rod, lever or arm 36 pivotally mounted to the front face of the end plate 24 by a pivot pin 38 at one end of the rod 36. The opposite end of the rod is notched as at 40 to receive a stop member 42 therein. The pivot pin 38 and the stop pin 42 are both attached to the end plate 24 and are disposed at the same height from the bottom of the end plate 24, and on opposite sides of the aperture 30, so that when the rod 36 is pivoted so that the notch 40 engages the stop member 42, the rod 36 is generally horizontal across the face of the end plate 24.

Figure 2:
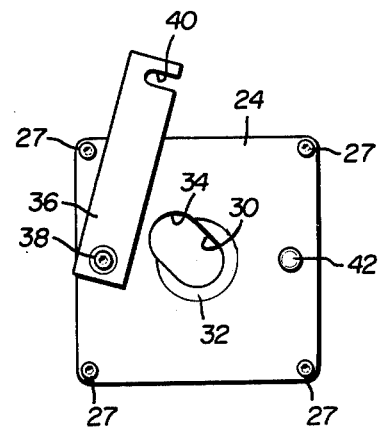
FIG. 2 is an end view of the tensioning device of FIG. 1 with the axial pressure means in a disengaged position.

FIG. 1 illustrates the rod 36 in the horizontal position maintaining the axial pressure on the paper 12 while FIG. 2 illustrates the rod 36 in a disengaged position.

According to the principles of the present invention, means are provided for causing a constant drag on the roll of paper. Specifically, a cylindrical plug 50, which may be made of plastic, has a circular bore 52 extending along its longitudinal axis. The circular bore 52 includes an elongated keyway or slot 54 extending the full length of the cylindrical plug 50.

Operating in conjunction with the cylindrical plug 50 is an elongated spindle or rod 56 which may also be made of plastic. The spindle or rod 56 includes an elongated shaft 58, which is of circular cross-section, and an elongated key 60 on the surface of the shaft 58 at one end thereof. The shaft 58 may be of constant diameter or of gradually increasing diameter from the first end thereof, i.e., the end at which the key 60 is located, to the opposite or second end thereof. At the second end of the shaft 58, the spindle 56 is provided with a thin circular flange 62 and, at the very end of the spindle 56, a short, stubby protrusion 64 of generally circular cross-section extending outwardly from the circular flange 62.

The operation of the present invention will now be explained. The plug 50 is secured rigidly to the cardboard core 14 of the paper supply roll. This may be accomplished either when the paper is initially wound upon the core 14 or at a later time. The roll of paper with the plug 50 secured to the core 14 is then inserted in the support frame means 20 with the plug 50 adjacent the end plate 22. The rod 36 is pivoted to the position of FIG. 2, i.e., so as not to obstruct the aperture 30, and the spindle 56 is inserted through the aperture 30 in the end plate 24, and interiorly of the core 14 of the paper roll. The insertion of the spindle 56 continues until the end 65 of the shaft 58 slides into the bore 52 of the plug 50 and the insertion of the spindle 56 continues until the end 65 of the spindle 56 extends outwardly a slight distance from the opposite end of the plug 50. Because of the key and keyway arrangement, the spindle 56 and plug 50 mate together in one and only one position. Next, the roll of paper with the plug 50 and rod 56 therein, is moved until the rod end 65 enters the socket 28 in the end plate 22.

The length of the rod 56 and core 14 are such relative to the length of the frame means 20, that the flange 62 will be journaled within the aperture 32 and the flange 62 will rest upon the circular, countersunk bearing surface 32. Then the rod 36 is pivoted until the hook end 40 engages the pin 42. This causes rod 36 to engage against the protrusion 64 to exert an axial pressure on the spindle 56 and plug 50 as demonstrated by the arrow P in FIG. 3. It may be seen, in FIG. 3, that the diameter of the flange 62 is greater than the inside diameter of the hole 30 to provide the bearing surface and maintain the proper relative positioning of the rod 56 and end plate 24.

When it is desired to remove the paper tensioning means, such as to replace the roll of paper with a new roll of paper, the rod 36 is unhooked from the pin 42 and moved out of engagement from the protrusion 64. As viewed in FIGS. 1 and 2, the rod or spindle 56 is moved upwardly and to the left toward the extension 34 of the aperture 30. Since this extension 34 is not tapered or chamfered to provide a bearing surface, movement of the rod 56 to the hole extension 34 assists in disengaging the tip 65 of the rod from the socket 28. This general movement may be accomplished, of course, by manually holding the paper 12 in one hand and pulling the paper to the upper left as viewed in FIG. 2.

Once the rod 56 has been disengaged from the socket 28, the flange 62 may be gripped by the fingers and pulled relative to the paper 12 to disengage the rod 56 from the plug 50. Then the paper 12 may be removed from the frame means 20 and a new roll of paper inserted within the frame means 20 and the entire procedure repeated.

Thus the present invention, as above described, provides for exerting an axial pressure on the rod 56, by engaging the protrusion 64 with the rod 36, which axial pressure is transferred to an axial pressure on the plug 50 since the plug 50 and rod 56 are in a mating relationship. Furthermore, since the plug 50 is secured to the core 14 of the paper 12, this axial pressure retards free rotation of the paper thus placing a constant, steady drag on the core and paper.

The foregoing is a complete description of a preferred embodiment of the present invention. Various modifications and optional features will now be explained.

Figure 7:
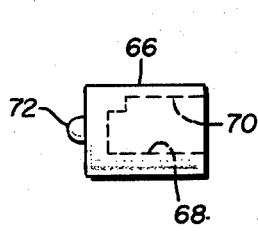
FIG. 7 is a front view of an alternate embodiment of the plug of the present invention.

Referring first to FIG. 7, an optional form of the plastic plug 66 is illustrated. The plug 66, which is also cylindrical, has an elongated central bore 68 and a keyway 70. The keyway, however, does not extend the full length of the plug nor does the bore 68. At the opposite end of the plug from the bore 68 a protrusion 72 is provided. The rod to be utilized with the plug 66 of FIG. 7 has a slightly shorter overall length, which may be accomplished by providing a slightly shorter several shaft portion 58 but in all other respects is the same. Since this shaft 58 is shorter, the shaft 58 does not extend through the plug 66 and for this reason the plug 66 is provided with its own protrusion 72 to rotate within the socket 28 in the end plate 22.

Figure 3:
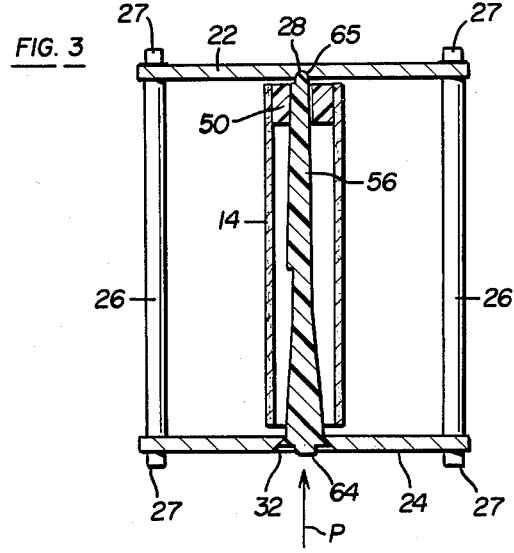
FIG. 3 is a sectional view of the tensioning device of FIG. 1, as seen in the plane of arrows 3—3 of FIG. 1, with the pressure means omitted for clarity.
Figure 8:
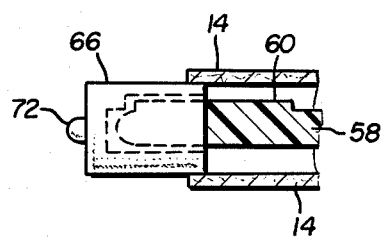
FIG. 8 is a diagrammatic illustration, partly in section, of an alternate means of securing the plug to the paper core.

Yet another feature of the present invention will now be explained. FIG. 3 illustrates, generally, the plug 50 rigidly secured interiorly of the core 14. As shown generally in FIG. 8, while it is necessary for the plug 66 to be rigidly secured to the core 14, it is not necessary that the plug 66 be completely interiorly of the core.

Thus it may be seen that the rod 56 and plug 50 provide not only the function of a spindle, so that the roll of paper may rotate to be unwound, but also provide the function of exerting a constant drag on the roll of paper to retard or resist the unwinding of the paper. This resistance or retarding is the result of axial pressure on the spindle or rod 56 and may thus be accomplished whether the plug is entirely within the core 14 of the paper or merely rigidly secured to the core.

It should be appreciated that the amount of drag is always the same regardless of the amount of paper 12 remaining on the core 14. This is because the drag is produced by an axial force initially on the protrusion 64, from the rod 36, which force is constant and this force is translated into an anti-rotational force on the core 14. Since the force acts on the interior of the core, which is of a constant diameter, the force is thus independent of the amount of paper remaining on the roll.

Figure 5:
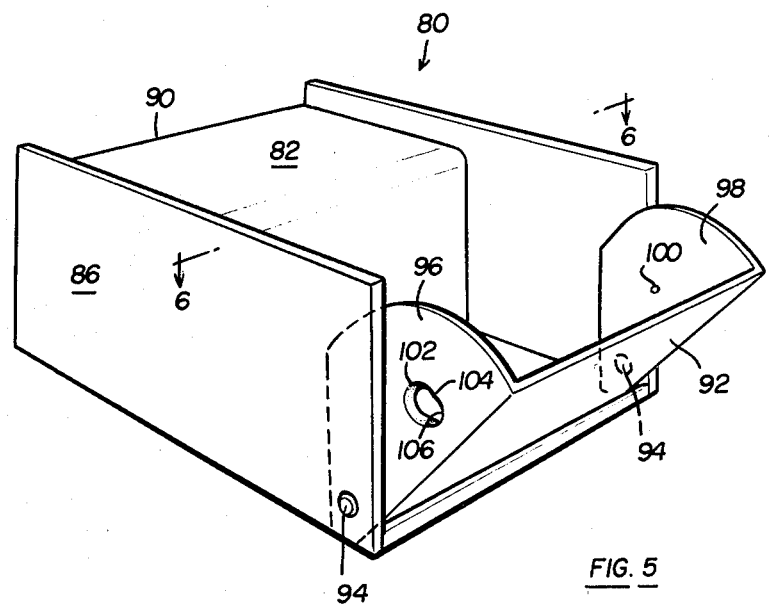
FIG. 5 is a perspective view of an alternate embodiment for applying axial force to the tensioning device of the present invention.
Figure 6:
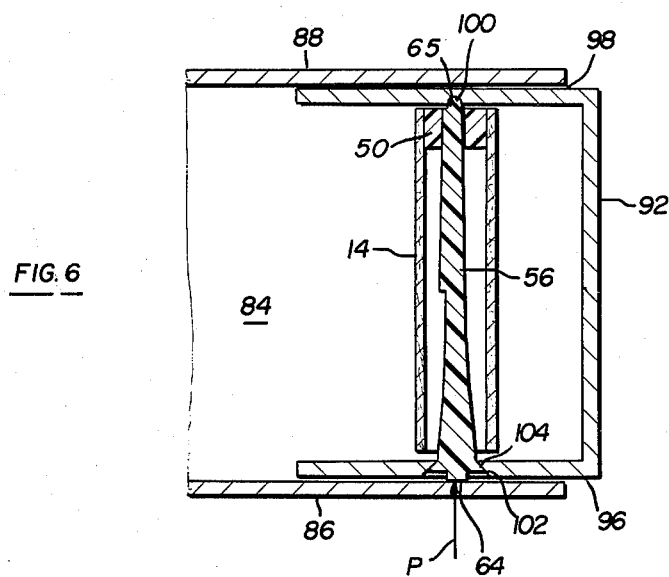
FIG. 6 is a partial sectional view of the tensioning device of FIG. 5, as seen in the plane of arrows 6—6 of FIG. 5, with the pressure applying means in the closed position.

The present invention may also be utilized in densitometers, chart recorders and other instruments which have a hinged tray to receive the supply of paper. With reference to FIGS. 5 and 6, such a densitometer includes a frame support means or support frame 80 including a top 82, a bottom 84, sides 86, 88, a first end 90 and a second end where a tray 92, which receives and supports the paper roll, is shown as hingedly connected as at 94 to the forward, lower corners of the sides 86 and 88 of the frame.

The hinged tray 92 further includes a first support side or wall 96 and a second support side or walls 98. The sides or walls 96 and 98 correspond, generally, to the end plates or walls 24 and 22, respectively, of the supporting frame means 20 of FIGS. 1, 2 and 3. The hinged tray side 98 is thus provided with a socket 100 to receive the protrusion 65 of the spindle 56 after the spindle 56 has been inserted through the plug 50. The side 98 96 of the hinged tray 92 has been provided with a generally circular aperture 102 having a corresponding countersunk or chamfered area 104 and a circular offset extension 106, all of which corresponds to the composite opening in the end plate 24 as shown in FIG. 2.

The paper is inserted into the hinged tray 92 of the embodiment of FIGS. 5 and 6 and the spindle 56 inserted into the plug 50 in the same fashion as this is accomplished with respect to the embodiment of FIGS. 1 through 3. The axial pressure on the spindle is produced in a different way, namely, by swinging or pivoting the hinged tray into a closed position, i.e., pivoting the tray 92 counterclockwise as illustrated in FIG. 5. Pivoting the tray 92 in a counterclockwise direction causes the supporting frame means 80, and specifically the side 86 thereof, to engage the protrusion 64 and to exert an axial pressure on the protrusion 64 as illustrated by the arrow P in FIG. 6.

When it is desired to remove the paper from the frame 80 of FIGS. 5 and 6, such as for replacing a roll of paper, the tray 92 is hinged or pivoted to an open position or moved clockwise to the position shown in FIG. 5. This disengages the frame side 86 from the protrusion 64. The roll of paper is then manually shifted generally to the right, to the offset portion 106 of the hole 102, and then the spindle 56 is disengaged from the plug 50 in the same fashion as with the explanation of the embodiment of FIGS. 1 through 3.

Figure 4:
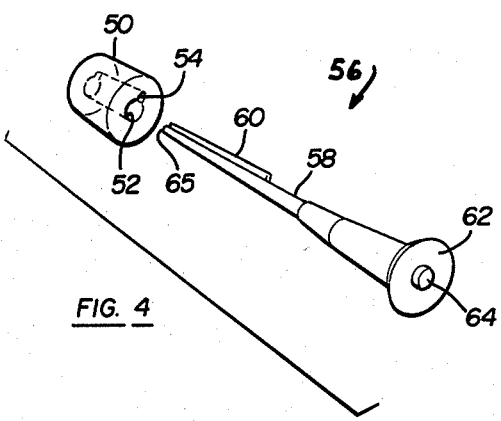
FIG. 4 is a perspective view of the plug and rod of the present invention.

As yet another option, the spindle 56 and plug 50 of FIG. 4 may be formed as an integral unit. The integral unit is slid into the cardboard core 14 and adhesively secured thereto.

Figure 9:
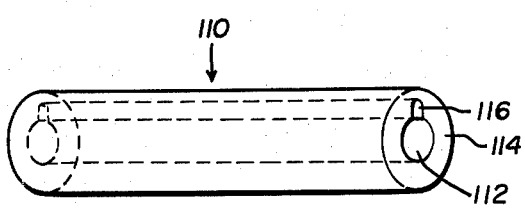
FIG. 9 is a perspective illustration of a combined plug and core.

FIG. 9 illustrates yet another embodiment where the core for the paper and the plug are integrally formed and may be made of plastic. This provides an elongated core unit 110 having a hollow bore 112 to receive the rod 56. The core 110 has a plug 114 integrally formed at one end and the bore 112 includes a keyway 116 along its entire length. In the embodiment of FIG. 9 the paper may be wound directly on the core 110.

Figure 10:
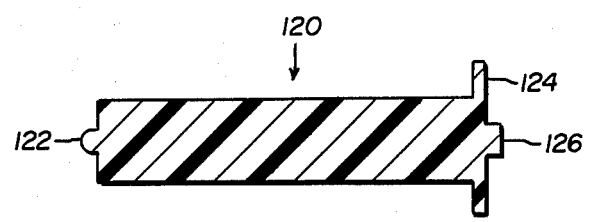
FIG. 10 is a sectional view of a combined plug, spindle and core.

As yet another embodiment the plug, spindle and core may be formed as a single integral unit as illustrated in FIG. 10 with the paper wound directly thereon. In the embodiment of FIG. 10 the core unit 120 includes a protrusion 122 at one end, to rotate in the socket 28 or 100, and a flanged end 124 with a protrusion 126 at the other end. The unit 120 may be formed of plastic.

Figure 11:
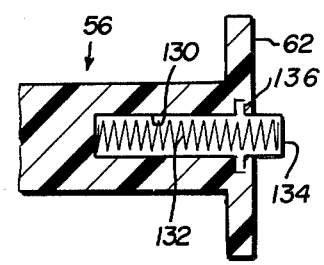
FIG. 11 is a partial sectional view of another embodiment of the present invention.

FIG. 11 illustrates yet another embodiment of the spindle 56. In this embodiment the spindle includes a bore 130 extending part way along the length of the spindle 56 from the flanged end 62. A spring 132 is positioned in the bore. In lieu of a protrusion 64 on the flange 62, a hollow button 134 is provided which is urged axially outwardly by the spring. The button 134 includes a flange 136 to prevent the spring 132 and button 134 from popping out of the bore 130. Axial pressure on the button 134 from either the arm 36 or the frame wall 86 compresses the spring 132 which, in turn, presses on the bottom of the bore 130 to urge the spring 132 against the plug to provide drag on the paper.

The foregoing is a complete description of a preferred embodiment of the present invention together with a description of various options and alternative embodiments. Many other changes can be made without departing from the spirit and scope of the present invention. The invention, therefore, should be limited only by the following claims.

What is claimed is:

1. In a chart recorder, densitometer or other instrument of the type including a supply of paper tightly wound around into a roll in the form of a hollow cylinder, the instrument including a support frame with a pair of spaced apart first and second support walls between which is rotatably supported the supply of paper, the improvement comprising:

a cylinder tubular core extending through the supply of paper and supporting same;

a cylindrical plug received in and secured to said tubular core, said plug having a bore;

an elongated spindle having first and second ends, said spindle extending through the interior of said core and having a length greater than the length of said core;

the support frame including a socket in said first support wall;

said spindle including a flange at the second end thereof, said support frame including an aperture in the second support wall to receive said spindle therethrough, said aperture having a countersunk bearing surface to receive said flange;

said spindle and plug having end portions thereof engaging said socket and aperture provided in the walls of said support frame for rotatably mounting said core and supply of paper in said frame;

said plug having an internal keyway and said elongated spindle having an axially extending key engaging said keyway for preventing relative rotation of said plug and said spindle;

said support frame further including means to exert an axial pressure on said spindle adjacent to said second end to urge said flange against said countersunk bearing surface in said second support wall, effective to assist in retarding rotation of said spindle and said plug keyed thereto thereby exerting a drag on said tubular core to resist free rotation and to resist unwinding of the paper from the core.

2. The invention defined in claim 1 wherein said plug and said core are formed as an integral unit; said unit being elongated and having a uniform outside diameter, with said bore and said keyway extending from one end of said integral unit to the other end.

3. The invention defined in claim 1 wherein said spindle has an axially extending blind bore located in the end surface thereof at said second end adjacent said flange, said bore having at the closed end thereof a first abutment surface, an annular groove adjacent the open end of said bore, an annular button provided with a rim which is received in said groove, with said button extending out of said bore, a spring located in said bore having one end abutting said first abutment surface and the other end abutting said button, said spring biasing said button out of said bore, said spring biased button cooperating with said pressure exerting means to assist in retarding rotation of said spindle.

4. The invention as defined in claim 1 wherein said plug is located entirely within said core, said bore extending completely through said plug, said spindle extending entirely through said core and said plug and having one of the end portions thereon received in said socket and the other end portion received in said aperture.

5. The invention as defined in claim 1 wherein said plug has one end portion located in one end of said core, with the remaining portion of said plug located outside of said core, the bore in said plug being closed on the end thereof outside of said core, said spindle extending into said bore and having the end portion thereon within said bore surrounded by said plug, the outer surface of said plug at the closed end thereof provided with an end portion received in said socket, with the other end portion provided on said spindle.

6. The invention as defined in claim 1 wherein said means to exert axial pressure on said spindle includes an arm pivotally mounted on said support frame.

7. The invention defined in claim 1 wherein said support frame includes a hinged tray supporting said core for rotation therewith and said support frame exerts axial pressure on said spindle.

8. The invention as defined in claim 1 wherein said plug includes an axially extending protrusion at one end thereof to support said core for rotation in said support frame.

9. In a chart recorder, densitometer or other instrument of the type including a supply of paper tightly wound around into a roll in the form of a hollow cylinder, the instrument including a support frame with a pair of spaced apart first and second support walls between which is rotatably supported the supply of paper, the improvement comprising:

an elongated integral solid core and spindle assembly of generally cylindrical configuration extending through the supply of paper and supporting same;

said elongated core and spindle assembly having first and second end portions, and having a length greater than the length of the roll of paper;

the support frame including a socket in said first support wall and an aperture in said second support wall through which said core and spindle assembly is inserted into the support frame;

said core and spindle assembly including an axially extending protuberance at said first end portion and a generally radially extending flange at the second end portion thereof;

said core and spindle assembly having said first and second end portions engaging respectively said socket and aperture provided in the walls of said support frame for rotatably mounting said supply of paper in said frame;

said support frame including means to exert an axial pressure on said integral core and spindle assembly adjacent to said second end portion to urge said flange against said second support walls, effective to assist in retarding rotation of said core and spindle assembly thereby exerting a drag thereon to resist free rotation and to resist unwinding of the paper therefrom.

10. The invention defined in claim 9 wherein said core and spindle assembly has an axially extending blind bore located in the end surface thereof at said second end adjacent said flange, said bore having at the closed end thereof a first abutment surface, an annular groove adjacent the open end of said bore, an annular button provided with a rim which is received in said groove, with said button extending out of said bore, a spring located in said bore having one end abutting said first abutment surface and the other end abutting said button, said spring biasing said button out of said bore, said spring biased button cooperating with said pressure exerting means to assist in retarding rotation of said core and spindle assembly.

11. The invention as defined in claim 9 wherein said means to exert axial pressure on said core and spindle assembly includes an arm pivotally mounted on said support frame.

12. The invention defined in claim 9 wherein said support frame includes a hinged tray supporting said core and spindle assembly for rotation therewith and said support frame exerts axial pressure on said assembly.

* * * * *